(12) United States Patent
Hayashi

(10) Patent No.: US 12,479,456 B2
(45) Date of Patent: Nov. 25, 2025

(54) INFORMATION PROCESSING APPARATUS, INFORMATION PROCESSING METHOD, AND VEHICLE

(71) Applicant: TOYOTA JIDOSHA KABUSHIKI KAISHA, Aichi-ken (JP)

(72) Inventor: Masatoshi Hayashi, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 69 days.

(21) Appl. No.: 18/496,930

(22) Filed: Oct. 30, 2023

(65) Prior Publication Data
US 2024/0149903 A1   May 9, 2024

(30) Foreign Application Priority Data
Nov. 4, 2022   (JP) .................................. 2022-177634

(51) Int. Cl.
*B60Q 1/00*   (2006.01)
*B60W 50/14*   (2020.01)

(52) U.S. Cl.
CPC ....... *B60W 50/14* (2013.01); *B60W 2050/146* (2013.01); *B60W 2554/4046* (2020.02); *B60W 2554/80* (2020.02); *B60W 2555/60* (2020.02); *B60W 2556/45* (2020.02)

(58) Field of Classification Search
CPC .......... B60W 50/14; B60W 2050/146; B60W 2554/4046; B60W 2554/80; B60W 2555/60; B60W 2556/45; G08G 1/0104; G08G 1/0175; G08G 1/052; G08G 1/096716; H04L 67/12

USPC ............. 340/425.5, 903, 435, 436, 438, 439
See application file for complete search history.

(56) References Cited

U.S. PATENT DOCUMENTS

| | | | |
|---|---|---|---|
| 10,002,534 B2 * | 6/2018 | Hu ........................ | G08G 1/0967 |
| 10,475,338 B1 * | 11/2019 | Noel ....................... | G08G 1/052 |
| 2006/0220905 A1 * | 10/2006 | Hovestadt .............. | G08G 1/052 |
| | | | 340/901 |
| 2018/0162391 A1 * | 6/2018 | Kim ........................ | B60K 35/10 |
| 2019/0308617 A1 * | 10/2019 | Groult .................... | B60Q 1/543 |

FOREIGN PATENT DOCUMENTS

| | | |
|---|---|---|
| JP | 2006205773 A | 8/2006 |
| JP | 2021-033505 A | 3/2021 |

\* cited by examiner

*Primary Examiner* — Anh V La
(74) *Attorney, Agent, or Firm* — HAUPTMAN HAM, LLP

(57) ABSTRACT

The purpose is to prevent inappropriate reporting of agitated driving. A controller, comprising at least one processor, of the information processing apparatus detects a predetermined action included in an act of aggressive driving by a second vehicle traveling within a predetermined range from a first vehicle. The controller of the information processing apparatus executes a predetermined discrimination process to determine whether or not the driving conditions of the first vehicle at time when the predetermined action is detected are appropriate for a traffic rules. When the controller determines in the predetermined discrimination process that the driving situation of the first vehicle is appropriate for the traffic rules, the controller outputs the first information to notify the predetermined agency that the second vehicle is driving in an agitated manner toward the first vehicle.

5 Claims, 5 Drawing Sheets

| CORRESPONDENCE INFORMATION ||
|---|---|
| driving condition | notification content |
| *** | *** |
| ⋮ | ⋮ |

Fig. 4

INFORMATION PROCESSING APPARATUS, INFORMATION PROCESSING METHOD, AND VEHICLE

CROSS REFERENCE TO THE RELATED APPLICATION

This application claims the benefit of Japanese Patent Application No. 2022-177634, filed on Nov. 4, 2022, which is hereby incorporated by reference herein in its entirety.

BACKGROUND

Technical Field

Present disclosure relates to information processing apparatus, information processing methods, and vehicles.

Description of the Related Art

Japanese Patent Laid-Open No. 2021-33505 discloses a driving support device. The driver assistance device disclosed in Japanese Patent Laid-Open No. 2021-33505 obtains driving information, which is information about the first vehicle driving. The driver assistance system determines whether the first vehicle is driving in an agitated manner toward the second vehicle based on the driving information acquired by the acquisition unit. If the driver assistance device is determined by the determination unit to be engaged in agitated driving, the driver assistance device notifies the driver of the first vehicle of the notification information regarding the agitated driving.

SUMMARY

The purpose of the present disclosure is to suppress inappropriate reporting of agitated driving.

An information processing apparatus according to a first aspect of the present disclosure includes a controller comprising at least one processor configured to;
  detect a predetermined action included in an act of aggressive driving by a second vehicle traveling within a predetermined range from a first vehicle,
  execute a predetermined discrimination process to determine whether or not the driving condition of the first vehicle at time when the predetermined action is detected is appropriate for a traffic rule, and
  output first information to notify a predetermined agency that the second vehicle is driving in an agitated manner toward the first vehicle when the predetermined discrimination process determines that the driving situation of the first vehicle is appropriate for the traffic rule.

An information processing method executed by a computer according to a second aspect of the present disclosure includes;
  detecting a predetermined action included in an act of aggressive driving by a second vehicle traveling within a predetermined range from a first vehicle,
  executing a predetermined discrimination process to determine whether or not the driving condition of the first vehicle at time when the predetermined action is detected is appropriate for a traffic rule, and
  outputting first information to notify a predetermined agency that the second vehicle is driving in an agitated manner toward the first vehicle when the predetermined discrimination process determines that the driving situation of the first vehicle is appropriate for the traffic rule.

A vehicle according to a third aspect of the present disclosure comprises an information processing apparatus comprising a controller comprising at least one processor configured to;
  detect a predetermined action included in an act of aggressive driving by a second vehicle traveling within a predetermined range from the vehicle,
  execute a predetermined discrimination process to determine whether or not the driving condition of the vehicle at time when the predetermined action is detected is appropriate for a traffic rule, and
  output first information to notify a predetermined agency that the second vehicle is driving in an agitated manner toward the vehicle when the predetermined discrimination process determines that the driving situation of the vehicle is appropriate for the traffic rule.

Present disclosure makes it possible to suppress inappropriate reporting of agitated driving.

BRIEF DESCRIPTION OF THE DRAWINGS

FIG. 4 is an example of the table structure of the correspondence information is indicate figure.

DESCRIPTION OF THE EMBODIMENTS

Figure 1:
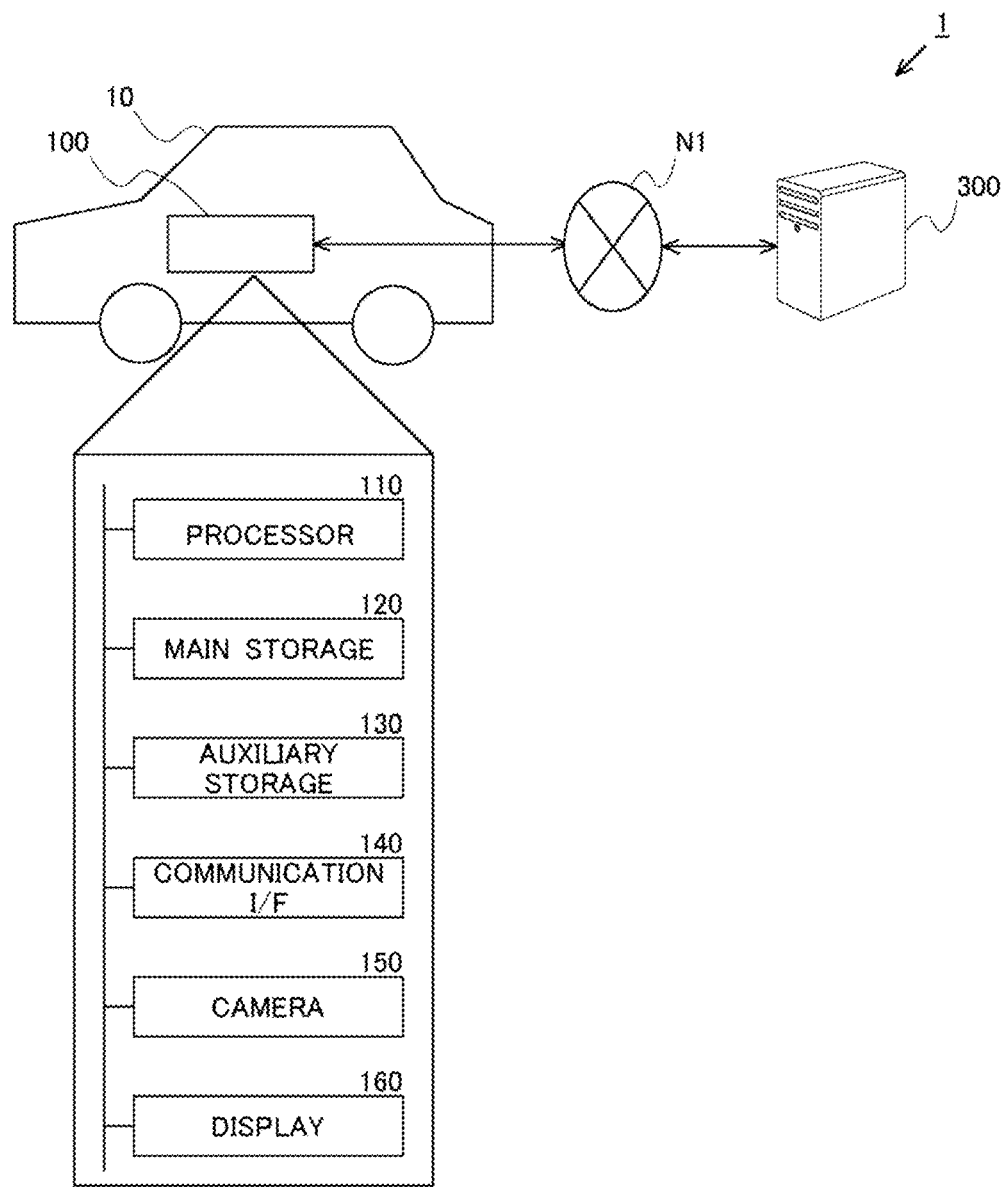
FIG. 1 is a schematic of the reporting system is a schematic of the reporting indicate diagram.

Assume that the driver of the first vehicle is driving the first vehicle. At this time, the driver of the first vehicle may be driving the first vehicle without realizing that the driving conditions of the first vehicle are inappropriate for the traffic rules. Then there are indicate cases where the second vehicle traveling within the first vehicle to predetermined range behaves differently than normal due to the inappropriate driving conditions of the first vehicle for the traffic rules.

For example, if the first vehicle is driving inappropriately with respect to the traffic rules, it is assumed that the driver of the second vehicle will perform unusual driving behavior with the intention of giving a warning to the driver of the first vehicle. It is also assumed, for example, that the first vehicle is obstructing the second vehicle because the first vehicle is driving inappropriately with respect to traffic rules. It is assumed that the driver of the second vehicle will perform an unusual driving action to change the positional relationship between the second vehicle and the first vehicle.

On the other hand, the driver of the first vehicle may be unaware that the first vehicle is driving inappropriately with respect to the traffic rules and may perceive that the driver of the second vehicle, which is exhibiting unusual behavior, is driving in an aggressive manner toward his vehicle. In such a case, the possibility arises that driver of the first vehicle may report to predetermined agency that an agitated driver is being driven by driver of the second vehicle against the first vehicle, even though driver of the second vehicle is not driving in an agitated manner. Here, the predetermined agency is the agency that accepts reports of agitated driving.

In such a case, there is a possibility that the driver of the first vehicle may make an inappropriate report regarding aggressive driving. The information processing apparatus in accordance with the first aspect of the present disclosure solves the problem of inappropriate reporting of agitated driving by the driver of the first vehicle.

The information processing apparatus according to the first aspect of the present disclosure is an information processing apparatus that notifies a predetermined agency when a first vehicle is subjected to aggressive driving. The controller, comprising at least one processor of the information processing apparatus detects the predetermined action included in the act of aggressive driving by the second vehicle. The controller of the information processing apparatus executes a predetermined discrimination process to determine whether or not the driving conditions of the first vehicle at the time of detection predetermined action are appropriate for the traffic rules. The controller of the information processing apparatus outputs the first information when it is determined in the predetermined discrimination process that the driving conditions of the first vehicle are appropriate for the traffic rules. Here, the first information is information that notifies a predetermined agency that the second vehicle is driving in an aggressive manner toward the first vehicle.

Predetermined actions included in the act of aggressive driving are actions that are generally recognized as being performed in aggressive driving, such as flashing headlights (passing), switching headlights to high beam, honking horns, and closing the distance between vehicles.

As explained above, the first information is output when the information processing apparatus detects a predetermined action by the second vehicle and when the driving conditions of the first vehicle are appropriate for the traffic rules. In other words, if the driving conditions of the first vehicle are inappropriate for the traffic rules, the first information is not output. Therefore, it is possible to suppress inappropriate reporting by the driver of the first vehicle who is under the illusion that he/she is being driven aggressively by the driver of the second vehicle, even though the driving conditions of the first vehicle are inappropriate for the traffic rules.

Specific embodiments of the present disclosure will be described below on the basis of the drawings. The technical scope of the present disclosure is not limited to sizes, materials, shapes, relative arrangement, and the like of constituent components described in the present embodiments unless otherwise described.

Embodiment (System Overview)

Figure 2:
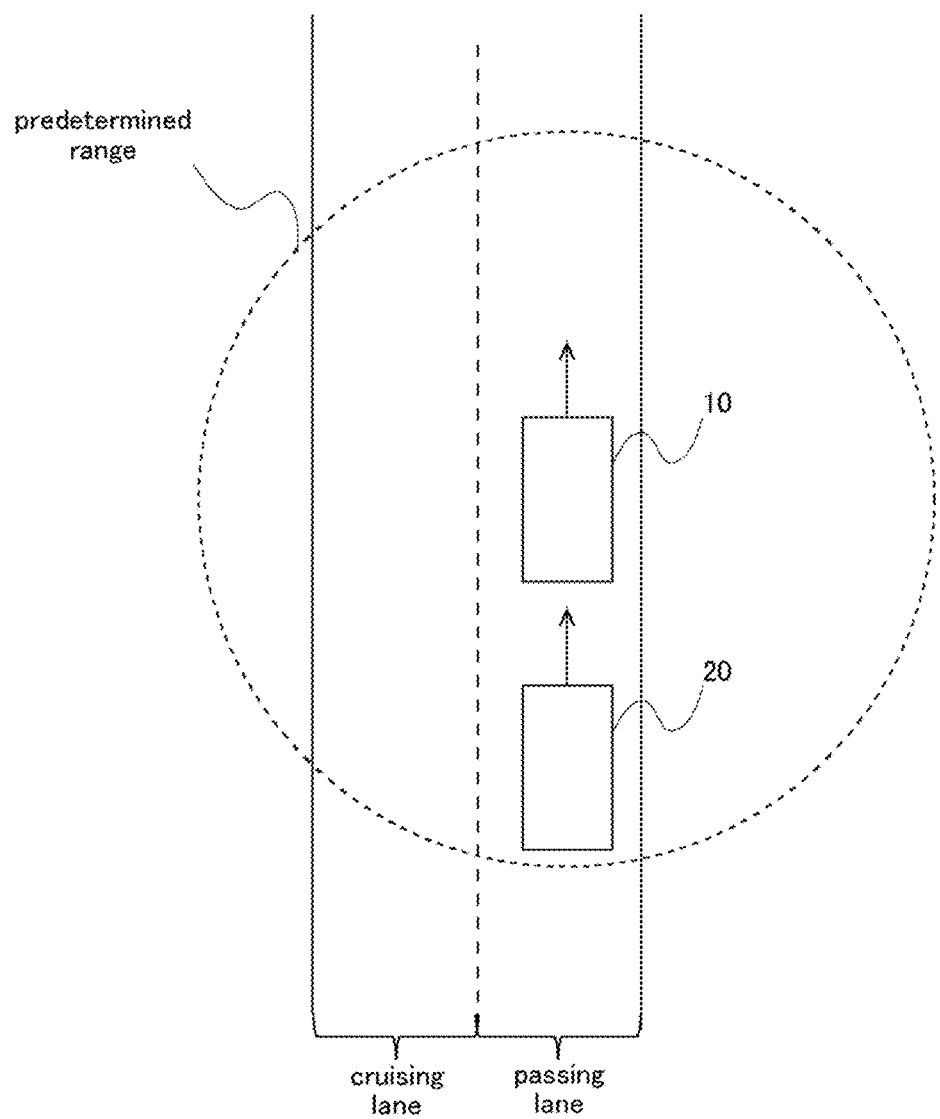
FIG. 2 indicates an example of a first vehicle traveling on a road.

The reporting system 1 in this embodiment is described based on FIG. 1 and FIG. 2 FIG. 1 indicates a schematic diagram of the reporting system 1. The reporting system 1 comprises a first vehicle 10, a reporting device 100, and an agency server 300. In the reporting system 1, the reporting device 100 and the agency server 300 are interconnected by the network N1. For example, a network (WAN), which is a worldwide public communication network such as the Internet, or a telephone communication network such as a cellular phone may be employed for the network N1. The first vehicle 10 and the reporting device 100 are interconnected by an in-vehicle network.

(First Vehicle)

First vehicle 10 is a vehicle equipped with the reporting device 100. FIG. 2 indicates an example of the first vehicle 10 traveling on a road. As indicated in FIG. 2, the first vehicle 10 is traveling in the passing lane on a two-lane road in one direction. In addition, the second vehicle 20 is traveling within predetermined range of the first vehicle 10. The second vehicle 20 is traveling behind the first vehicle 10. In this case, the driving conditions of the first vehicle 10 may not be appropriate for the traffic rules. In this embodiment, the driving situation of the first vehicle 10 that is not appropriate for the traffic rule is a situation where the speed of the first vehicle 10 is lower than the speed limit of the road on which the first vehicle 10 is traveling by more than a predetermined value.

Here, the predetermined value can be a value at which the first vehicle 10 can interfere with the travel of another vehicle traveling behind the first vehicle 10. Predetermined values may be set for each road link, for example. In the example indicated in FIG. 2, the first vehicle 10 is traveling at a speed that interferes with the second vehicle 20. Thus, the driving situation of the first vehicle 10 is not appropriate for the traffic rules.

If the driving conditions of the first vehicle 10 are not appropriate for the traffic rules, the driver of the second vehicle 20 may perform a different predetermined driving behavior than normal. The second vehicle 20 of driver performs the predetermined driving operation, the second vehicle 20 performs the predetermined action contained in act of aggressive driving. In this embodiment, the predetermined driving behavior is to flash the headlights a predetermined number predetermined times or more. This causes the second vehicle 20 to flash its lights a predetermined number predetermined times or more in a short period of time, a predetermined action. The predetermined action may be an action that simultaneously performs multiple actions included in the agitated driving behavior.

In order to inform the driver of the first vehicle 10 that the travel speed of the second vehicle 20 is obstructed due to the low travel speed of the first vehicle 10, the driver of the second vehicle 20 is expected to perform the predetermined driving behavior by flashing the headlights more than predetermined times. In other words, the driver of the second vehicle 20 is not performing the predetermined driving behavior for the purpose of aggressive driving against the first vehicle 10, but to encourage the driver of the first vehicle 10 to improve the driving conditions of the first vehicle 10.

On the other hand, the driver of the first vehicle 10 may not be aware that he is obstructing the second vehicle 20 due to the fact that the speed of the first vehicle 10 is more than a predetermined value lower than the speed limit of the road on which the first vehicle 10 is traveling. In this case, a driver of the first vehicle 10 who receives more than a predetermined number predetermined headlight flashes from the second vehicle 20 may perceive that the driver of the second vehicle 20 is driving in an aggressive manner toward the first vehicle 10. This would create the possibility that the first vehicle 10 driver would report to predetermined agency that the second vehicle 20 is driving in an aggressive manner, even though the second vehicle 20 driver does not have the intent to drive in an aggressive manner. Here, the predetermined agency is the agency that accepts reports of agitated driving. A predetermined agency is, for example, a police agency.

Thus, a predetermined action by the second vehicle 20 to encourage the first vehicle 10 driver to improve the driving conditions of the first vehicle 10 may be perceived by the first vehicle 10 driver to be an action for agitated driving. If the predetermined action by the second vehicle 20 is performed, then the possibility arises that the driver of the first vehicle 10 may make an unwanted report to the predetermined agency that the driver of the second vehicle 20 is driving in an agitated manner.

In the present embodiment, the predetermined action is to flash the headlights a predetermined times or more. However, the predetermined action does not necessarily have to be to flash the headlights a predetermined times or more. For example, it is assumed that the distance between the first vehicle 10 and the second vehicle 20 may be unintentionally shortened when the speed of the first vehicle 10 is lower than the predetermined value of the speed limit of the road on which the first vehicle 10 is traveling. In this case, the driver of the second vehicle 20 may repeat the driving operation to accelerate and the driving operation to maintain the distance between vehicles (deceleration operation). The driver of the first vehicle 10 may then perceive that the driver of the second vehicle 20 is driving in an aggressive manner toward the first vehicle 10. In such a case, the predetermined action can be an operation to drive so that the distance between the first vehicle 10 and the second vehicle 20 falls below predetermined threshold value a predetermined number of times or more.

(Reporting Device)

The reporting device 100 is a device mounted on the first vehicle 10. The reporting device 100 is a device that notifies a predetermined agency when it determines that a vehicle in the vicinity of the first vehicle 10 is driving in an aggressive manner toward the first vehicle 10. The reporting device 100 captures moving images including the movement of the vehicle around the first vehicle 10 by the camera 150 in the reporting device 100. The reporting device 100 detects predetermined action regarding the agitated driving by vehicle around the first vehicle 10 against the first vehicle 10 based on the moving image including the behavior of vehicle around the first vehicle 10.

The reporting device 100 obtains the driving condition of the first vehicle 10 when it detects the predetermined action by the second vehicle 20. The reporting device 100 then determines whether the acquired driving conditions of the first vehicle 10 are appropriate for the traffic rules. Here, if the driving conditions of the first vehicle 10 are appropriate, the predetermined action by the second vehicle 20 can be presumed to be an action for the purpose of agitated driving. Therefore, the reporting device 100 outputs reporting information when the acquired driving conditions of the first vehicle 10 are determined to be appropriate for the traffic rules. Here, the reporting information is information for reporting to a predetermined agency that the second vehicle 20 is driving in an aggressive manner toward the first vehicle 10. The reporting device 100 then sends the report information to the agency server 300 via network N1.

The reporting device 100 comprises a computer having a processor 110, main memory 120, auxiliary storage 130, communication interface (communication I/F) 140, camera 150, and display 160. Processor 110 is, for example, a CPU (Central Processing Unit) or DSP (Digital Signal Processor). The main storage 120 is, for example, RAM (Random Access Memory). The auxiliary storage 130 is, for example, ROM (Read Only Memory). The auxiliary storage 130 is, for example, a hard disk drive (HDD) or a disk storage medium such as a CD-ROM, DVD disk, or Blu-ray disk. The auxiliary storage 130 may be removable media (portable storage media). Here, USB memory sticks or SD cards are examples of removable media. The communication I/F 140 is, for example, a LAN (Local Area Network) interface board or a wireless communication circuit for wireless communication.

In the reporting device 100, the auxiliary storage 130 stores an operating system (OS), various programs, and various information tables. In the reporting device 100, the processor 110 can load the program stored in the auxiliary storage 130 into the main storage 120 and execute it to realize various functions as described below. However, some or all of the functions in the reporting device 100 may be realized by hardware circuits such as ASICs or FPGAs. The reporting device 100 does not necessarily have to be realized by a single physical configuration, but may be composed of multiple computers that are linked to each other.

(Agency Server)

The agency server 300 is a server device that accepts reports from the reporting device 100. The agency server 300 is, for example, a server device managed by a predetermined agency. The agency server 300 receives the reporting information from the reporting device 100 via network N1. When the agency server 300 receives the report information from the reporting device 100, it arranges for a police officer to police the second vehicle 20.

(Functional Configuration)

Figure 3:
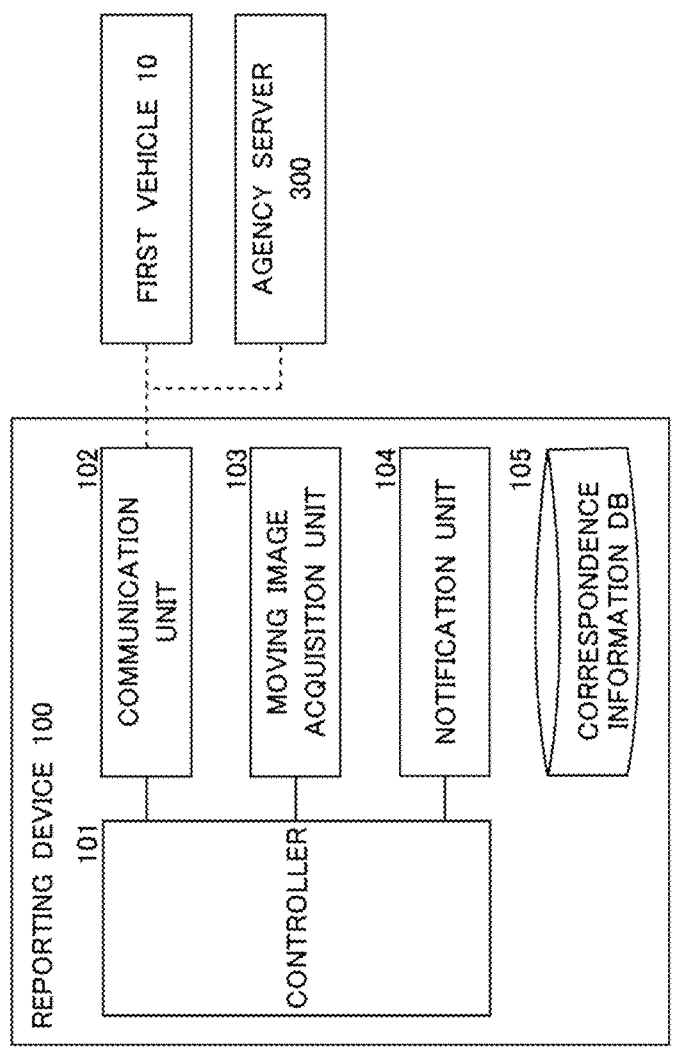
FIG. 3 illustrates a schematic indicate block diagram of an example of the functional configuration of a reporting device.

Next, the functional configuration of the reporting device 100, which constitutes the reporting system 1, is described based on FIG. 3 and FIG. 4 FIG. 3 is a block diagram indicating an example of the functional configuration of the reporting device 100.

The reporting device 100 comprises a controller 101, a communication unit 102, a moving image acquisition unit 103, a notification unit 104, and a correspondence information database (correspondence information DB) 105. The controller 101 has the function of performing arithmetic operations to control the reporting device 100. The controller 101 can be realized by the processor 110 in the reporting device 100. The communication unit 102 has the function of connecting the reporting device 100 to the network N1 and the in-vehicle network. The communication unit 102 can be realized by the communication I/F 140 in the reporting device 100.

The moving image acquisition unit 103 has the function of acquiring moving images captured by the camera 150. The moving image acquisition unit 103 acquires moving images of the surroundings of the first vehicle 10 captured by the camera 150. The moving image acquisition unit 103 sends the acquired moving image to the controller 101.

The controller 101 acquires moving images about the surroundings of the first vehicle 10 from the moving image acquisition unit 103. Here, the moving image of the surroundings of the first vehicle 10 acquired by the moving image acquisition unit 103 (hereinafter simply referred to as "moving image") may include vehicles traveling around the first vehicle 10. In the example indicated in FIG. 2, the moving image includes the driving of the second vehicle 20. The controller 101 detects predetermined action by the second vehicle 20 by determine that the second vehicle 20 is doing predetermined action based on the moving image. In this embodiment, the controller 101 counts the number of times the headlights of the second vehicle 20 blink, and when the number of times the headlights of the second vehicle 20 blink reaches a predetermined number, it determines that the second vehicle 20 is performing the predetermined action. In this way, the controller 101 detects the predetermined action by the second vehicle 20.

The controller 101 obtains the running status of the first vehicle 10 at the time of detection of predetermined action by the second vehicle 20. The controller 101 then determines whether the driving conditions of the first vehicle 10 are appropriate. In this embodiment, controller 101 determines whether the driving conditions of the first vehicle 10 are appropriate for the traffic rules by determining whether the speed of the first vehicle 10 is lower than the predetermined value of the speed limit of the road on which the first vehicle 10 is traveling. Here, the controller 101 obtains the speed limit of the road on which the first vehicle 10 is traveling based on the position information of the first vehicle 10 at the time of detection of the predetermined action. The controller 101 also obtains, via the communication unit 102, the travel speed of the first vehicle 10 at the time of detection of the predetermined action from the first vehicle 10.

The controller 101 determines that the driving conditions of the first vehicle 10 are appropriate for the traffic rule when the driving speed of the first vehicle 10 is not lower than a predetermined value than the speed limit. The controller 101 determines that the driving conditions of the first vehicle 10 are not appropriate for the traffic rule when the driving speed of the first vehicle 10 is lower than the speed limit by a predetermined value or more.

If the predetermined action by the second vehicle 20 is detected and the driving conditions of the first vehicle 10 are determined to be adequate, the predetermined action cannot be presumed to be an action to encourage the first vehicle 10 to driver improve the driving conditions of the first vehicle 10. Therefore, the driver of the second vehicle 20 is presumed to be driving in an aggressive manner toward the first vehicle 10. Therefore, the controller 101 outputs the reporting information. The reporting information may include a moving image including a predetermined movement of the second vehicle 20 obtained by the moving image acquisition unit 103. The controller 101 transmits the outputted reporting information to the agency server 300 via the communication unit 102.

Assume also that the controller 101 determines that the driving conditions of first vehicle 10 are not appropriate for the traffic rules. In this case, the predetermined action by the second vehicle 20 is presumed to be an action to encourage the driver of the first vehicle 10 to improve the driving conditions of the first vehicle 10, rather than an action for the purpose of aggressive driving. Therefore, if the controller 101 determines that the driving conditions of first vehicle 10 are not appropriate for the traffic rules, it outputs notification information. Here, the notice information is information to advise driver of the first vehicle 10 to advise driver of the first vehicle 10 to make the driving conditions of the first vehicle 10 appropriate for the traffic rules.

Correspondence information DB 105 has the function of holding correspondence information. The correspondence information is information for associating the driving conditions of the first vehicle 10 with the content of a notice advising the driver of the first vehicle 10 to make the driving conditions of the first vehicle 10 appropriate for the traffic rules. The correspondence information DB 105 can be realized by the auxiliary storage 130 in the reporting device 100. FIG. 4 indicates an example of the table structure of the correspondence information.

As indicated in FIG. 4, the correspondence information has a driving condition field and a notification content field. The driving situation field contains information indicating driving situations that are not appropriate for the traffic rule. The driving situation field contains, for example, an identifier corresponding to a driving situation that is not appropriate for the traffic rules of first vehicle 10.

The notification content field contains the content of the notification information (e.g., a message to indicate the driver of the first vehicle) to be output when the driving status of the first vehicle 10 matches the driving status indicated by the identifier stored in the driving status field. controller 101 determines that the first vehicle 10 driving situation is not appropriate for the traffic rule, it obtains the notification content corresponding to that driving situation based on the correspondence information maintained in the correspondence information DB105. The controller 101 then outputs the notification information based on the acquired notification contents.

The notification unit 104 has the function of notifying various information to the driver of the first vehicle 10. The notification unit 104 can be realized by the display 160 in the reporting device 100. The notification unit 104 obtains notification information from the controller 101. Then, the notification unit 104 notifies the driver of the first vehicle 10 to make the driving conditions of the first vehicle 10 appropriate for the traffic rules based on the notification information. This allows the driver of first vehicle 10 to understand that the driving conditions of first vehicle 10 are not appropriate for the traffic rules. It also allows the driver of first vehicle 10 to improve the driving conditions of first vehicle 10 so that the driving conditions of first vehicle 10 are appropriate for the traffic rules.

When the notification information is notified by the notification unit 104, the driver of the first vehicle 10 drives such that the driving conditions of the first vehicle 10 are appropriate for the traffic rules. This improves the driving conditions of the first vehicle 10 to be appropriate for the traffic rules. Therefore, the second vehicle 20 does not need to perform the predetermined actions to encourage the driver of the first vehicle 10 to improve the driving conditions of the first vehicle 10.

However, the first vehicle 10 driver may continue predetermined action even though the second vehicle 20 has improved the driving situation. In this case, the driver of the second vehicle 20 is presumed to be driving in an aggressive manner toward the first vehicle 10. Therefore, controller 101 outputs the notification information if it detects that predetermined action by the second vehicle 20 continues to be made after predetermined time has elapsed since the notification information was output. The predetermined time is set as a time sufficient for the driver of the first vehicle 10 to make the driving conditions of the first vehicle 10 appropriate. The controller 101 then transmits the reporting information to the agency server 300 via the communication unit 102.

(Flowchart)

Figure 5:
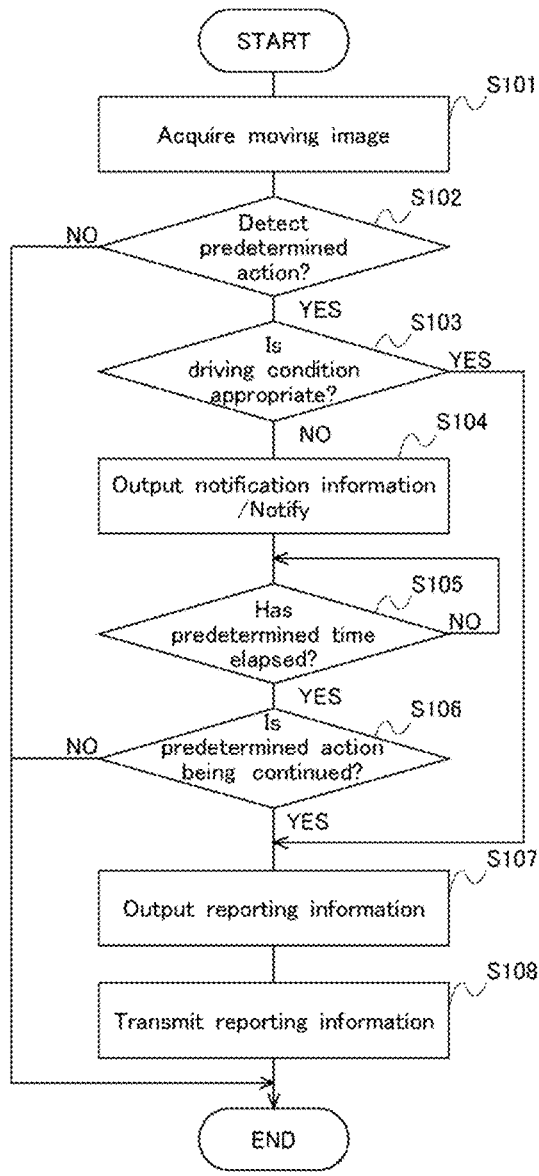
FIG. 5 is a flowchart of the process performed by controller.

Next, the processes executed by the controller 101 in the reporting device 100 in the reporting system 1 are described based on FIG. 5. FIG. 5 is a flowchart of the process executed by the controller 101. The process concerned is to report the second vehicle 20 to predetermined agency when the second vehicle 20 driver is driving in an agitated manner against the first vehicle 10. The process shown in FIG. 5 is repeated at predetermined intervals.

In the illustrated process, a moving image is first acquired from the moving image acquisition unit 103 in S101. Next, in S102, it is determined whether or not a predetermined action by the second vehicle 20 is detected based on the moving image. If a negative decision is made in S102, the process is terminated because the second vehicle 20 is not performing the predetermined action.

If a positive decision is made in S102, it is unclear whether the predetermined action by the second vehicle 20 is an action for the purpose of agitated driving or to inform driver of the first vehicle 10 that the driving conditions of the first vehicle 10 are not appropriate. Therefore, in S103, a determination is made as to whether the driving conditions of first vehicle 10 are appropriate for the traffic rules. If a positive judgment is made in S103, it can be presumed that the second vehicle 20 is performing the predetermined action for the purpose of agitated driving, so the reporting information is output in S107. Then, in S108, the reporting information is transmitted to the agency server 300.

If a negative decision is made in S103, notification information is output in S104. The notification information is also notified to the driver of first vehicle 10 in S104. Next, in S105, a determination is made as to whether or not a predetermined time has elapsed since the process in S104 was executed. If a negative decision is made in S105, the process in S105 is executed again. In this way, the discrimination process of S105 is executed until a predetermined time elapses after the process of S104 is executed. If a positive decision is made in S105, the process in S106 is executed.

Next, at S106, a determination is made as to whether or not the predetermined action by the second vehicle 20 is being continued. If a positive decision is made in S106, it is presumed that the driver of the second vehicle 20 is driving in an aggressive manner toward the first vehicle 10. Therefore, processes S107 and S108 are executed. This allows the second vehicle 20 to report to predetermined agency that the second vehicle 20 is driving in an agitated manner against the first vehicle 10 by driver. If a negative judgment is made in S106, it is presumed that the predetermined action performed by the second vehicle 20 was not made for the purpose of aggressive driving against the first vehicle 10. In such cases, the process is terminated.

As explained above, in the reporting system 1 of this embodiment, the reporting information is sent to the agency server 300 when the predetermined action by the second vehicle 20 is detected and the driving conditions of the first vehicle 10 are appropriate for the traffic rules. Therefore, it is possible to suppress the possibility that a driving action to inform that the driving condition of the first vehicle 10 is inappropriate according to the traffic rules is judged as an aggressive driving action. It is also possible to suppress inappropriate reporting due to the fact that the driving behavior to inform that the driving condition of the first vehicle 10 is inappropriate for the traffic rules is judged as an aggressive driving behavior.

(Variant 1)

In this embodiment, in the reporting system 1, the reporting device 100 executes the above process. However, the processes described above do not necessarily have to be performed by the reporting device 100. The above process may be performed by an external device other than the reporting device 100. An external device other than the reporting device 100 is, for example, a server device that communicates with the reporting device 100. In this case, the external device performs the process described above by receiving information from the reporting device 100 about the moving image and the driving conditions of the first vehicle 10.

(Variant 2)

In this embodiment, the example of a situation in which the driving situation of the first vehicle 10 is not appropriate is a situation in which the driving speed of the first vehicle 10 is lower than the predetermined value of the speed limit of the road on which the first vehicle 10 is traveling. However, there may be other situations where the driving conditions of the first vehicle 10 are not appropriate. Examples of inappropriate driving conditions include driving across multiple lanes, driving in a bus lane, or driving on the wrong side of the road. This is because in these situations, the driver of the second vehicle 20 may perform a predetermined driving behavior without the intention of agitated driving.

Thus, if there are multiple driving situations that are not appropriate for the traffic rule, multiple information will be entered in the driving situation field in the correspondence information held in the correspondence information DB105. In this case, the reporting device 100 identifies the driving condition of the first vehicle 10 from the sensor values related to the driving of the first vehicle 10. Then, the system outputs the notification information including the notification content corresponding to the driving condition of the first vehicle 10. The reporting device 100 may infer the driving condition of the first vehicle 10 using a model that has been trained with the relationship between the sensor values related to the driving of the first vehicle 10 and the driving condition of the first vehicle 10. The controller 101 may then output notification information based on the inferred driving conditions of the first vehicle 10.

Other Embodiments

The embodiments described above are examples only, and the present disclosure may be modified and implemented as appropriate without departing from the gist thereof. The processes and means described in present disclosure may be freely combined as long as no technical contradictions arise.

The process described as being performed by one device may be shared and executed by multiple devices. Alternatively, the processes described as being performed by different devices may be performed by one device. In a computer system, it is possible to flexibly change what hardware configuration (server configuration) is used to realize each function.

Present disclosure can also be realized by supplying a computer program implementing the functions described in the above embodiments to a computer, and having one or more processors of said computer read and execute the program. Such computer programs may be provided to a computer by a non-transitory computer-readable storage medium that can be connected to the computer's system bus, or may be provided to a computer over a network. Non-transitory computer-readable storage media include any type of disk, for example, magnetic disks (such as floppy (registered trademark) disks or hard disk drives (HDDs)), optical disks (such as CD-ROMs, DVD disks, or Blu-ray disks). Non-transitory computer-readable storage media include any type of media suitable for storing electronic instructions, such as, for example, read-only memory (ROM), random access memory (RAM), EPROM, EEPROM, magnetic cards, flash memory, or optical cards.

What is claimed is:

1. An information processing apparatus comprising a controller comprising at least one processor configured to:
   detect a predetermined action included in a road rage by a second vehicle traveling behind and within a predetermined range from a first vehicle;
   execute a predetermined discrimination process to determine whether or not the first vehicle, at the time when the predetermined action is detected, is driving across multiple lanes; and output first information to notify a predetermined agency that the second vehicle is engaging in the road rage toward the first vehicle when the road rage by the second vehicle is detected and the predetermined discrimination process determines the first vehicle is not driving across multiple lanes.

2. The information processing apparatus according to claim 1, wherein
the controller outputs second information that advises a driver of the first vehicle to make the driving situation of the first vehicle appropriate for the traffic rule, if a determination is made that the first vehicle is driving across multiple lanes in the predetermined discrimination process.

3. The information processing apparatus according to claim 2, wherein
the controller outputs the first information when the controller detects that the predetermined action by the second vehicle continues after predetermined time has elapsed after outputting the second information.

4. An information processing method executed by a computer including;
detecting a predetermined action included in a road rage by a second vehicle traveling behind and within a predetermined range from a first vehicle,
executing a predetermined discrimination process to determine whether or not the first vehicle, at the time when the predetermined action is detected, is driving across multiple lanes, and
outputting first information to notify a predetermined agency that the second vehicle is engaging in the road rage toward the first vehicle when the road rage by the second vehicle is detected and the predetermined discrimination process determines the first vehicle is not driving across multiple lanes.

5. A vehicle comprising an information processing apparatus comprising a controller comprising at least one processor configured to;
detect a predetermined action included in a road rage by a second vehicle traveling behind and within a predetermined range from a first vehicle;
execute a predetermined discrimination process to determine whether or not the first vehicle, at the time when the predetermined action is detected, is driving across multiple lanes; and
output first information to notify a predetermined agency that the second vehicle is engaging in the road rage toward the first vehicle when the road rage by the second vehicle is detected and the predetermined discrimination process determines the first vehicle is not driving across multiple lanes.

* * * * *